United States Patent Office 3,644,380
Patented Feb. 22, 1972

3,644,380
PREPARATION OF 3-CYANOPYRIDINE
Ronald Harmetz, Dover, and Roger J. Tull, Metuchen, N.J., assignors to Merck & Co., Inc., Rahway, N.J.
No Drawing. Filed Nov. 24, 1969, Ser. No. 879,519
Int. Cl. C07d 31/46
U.S. Cl. 260—294.9
8 Claims

ABSTRACT OF THE DISCLOSURE

A process for preparing 3-cyanopyridine which comprises the steps of reacting 2-methyleneglutaronitrile with chlorine, bromine or iodine and reacting said 2-halo-2-halomethylglutaronitrile with a Lewis acid producing the intermediate compound, 3-halo-dihydro-3-cyano-pyridine wherein the latter compound undergoes dehydro-dehalogenation when reacted with a base and converted to the expected 3 - cyanopyridine(nicotinonitrile). The latter compound is a valuable intermediate for the production of niacin (nicotinic acid), the anti-pellagra B complex vitamin.

SUMMARY OF THE INVENTION

This invention relates to new processes for the preparation of 3-cyanopyridine and novel intermediates used in the preparation of that compound. More particularly, it relates to the preparation of 3-cyanopyridine starting with non-heterocyclic starting materials, namely, 2-methyleneglutaronitrile or acrylonitrile.

BACKGROUND OF THE INVENTION 3-cyanopyridine (nicotinonitrile) is a valuable intermediate useful in the preparation of nicotinic acid (niacin) and nicotinamide. Nicotinamide is an essential B vitamin with antipellagra activity and facile synthetic schemes for obtaining it are constantly being sought. However, many of the schemes involved in synthesizing the intermediate 3-cyanopyridine involve a large number of steps or utilize expensive or not readily available starting materials. Thus, inexpensive and facile processes for obtaining 3-cyanopyridine have been sought.

DESCRIPTION OF THE INVENTION

The present invention provides a facile method for obtaining 3-cyanopyridine (IV) from readily available starting materials as seen in the following flow sheet:

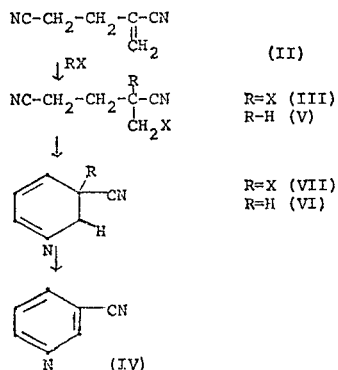

In accordance with the foregoing flow sheet, 3-cyanopyridine is prepared from 2-methylene glutaronitrile.

2-methyleneglutaronitrile (II), prepared by known methods, is reacted with a compound of the type RX where X is a halogen and R is either hydrogen or X. The reaction is a simple addition across a double bond forming III where R is X and V where R is H.

III and V are treated with a Lewis acid in a cyclization reaction such that the nitrile group farthest from the halomethyl group reacts with that group, displacing the halogen (X) and forming VI where R is H and VII where R is X.

HR is eliminated from each of these compounds forming the desired 3-cyanopyridine. The elimination is carried out by treatment with alkali in the case where R is equal to halogen and catalytically in the case where R is equal to hydrogen.

In accordance with one embodiment of our invention, 2-methyleneglutaronitrile is halogenated by reaction with chlorine, bromine or iodine to obtain the corresponding 2-halo-2-halomethylglutaronitrile which is then cyclized by reaction with a Lewis acid and the resulting reaction product is treated with a base to produce the desired 3-cyanopyridine.

The halogenation is readily effected by intimately contacting the nitrile with the halogen, preferably at temperatures below about 30° C. The reaction can be carried out in the presence of a non-reactive solvent, although generally we find that a solvent is unnecessary. The halogenated product obtained, for example, by passing chlorine through the 2-methyleneglutaronitrile while maintaining the reaction mixture at a temperature 15–20° C. can be used directly in the next step; or, if desired, can be purified by distillation under reduced pressure.

The cyclization step is effected by heating the intermediate dihalo compound with a Lewis acid. Although any Lewis acid can be used in this process, we prefer to use stannic chloride, aluminum chloride, titanium chloride, or boron trifluoride etherate since maximum yields of 3-cyanopyridine are obtained with these acids under optimum conditions. The cyclization proceeds at temperatures from 80 to 250° C. although, generally, we prefer to carry out the reaction at a temperature of 125 to 200° C. The time required for this step will vary, depending upon the temperature and the Lewis acid used, but usually the reaction is complete in 2–5 hours. Although the reaction can be carried out without a solvent, we find that it is most conveniently effected in a suitable solvent medium, preferably one having a boiling point of at least 150° C. Examples of suitable solvents that might be mentioned are nitrobenzene or halogenated hydrocarbons such as ortho dichrolobenzene. Although the reaction can be effected at atmospheric pressure, we find that better yields are obtained when the reaction is effected in a sealed vessel.

After completion of the cyclization step, the resulting reaction mixture is extracted with water to obtain an aqueous solution containing 3-halo-3-cyanodihydropyridine which, when treated with a base such as an alkali metal hydroxide, is converted to the desired 3-cyanopyridine.

In a modification of the above steps, 3-cyanopyridine can be prepared in one reaction vessel, without isolating any intermediates and, in fact, preparing the 2-methylene glutaronitrile itself by the known procedure of dimerizing acrylonitrile with a trialkyl phosphine such as tricyclohexyl phosphine in an inert solvent, preferably with a boiling point of less than 100° C. such as tetrahydrofuran. The 2-methyleneglutaronitrile prepared in situ is combined with a halogen, preferably in equimolar amounts to form the 2-halo-2-halomethyl glutaronitrile. The solvent is evaporated in vacuo and the residue treated with a solvent preferably a low boiling one (about 100° C.) capable of azotroping water from the system, and being non-reactive to Lewis acids. Benzene and toluene are suitable for this purpose. The Lewis acid is added to the residue and the reaction vessel is sealed and heated to affect the cyclization to 3-cyanopyridine. The reaction can be carried out at temperatures of 80–250° C. for 2–5 hours.

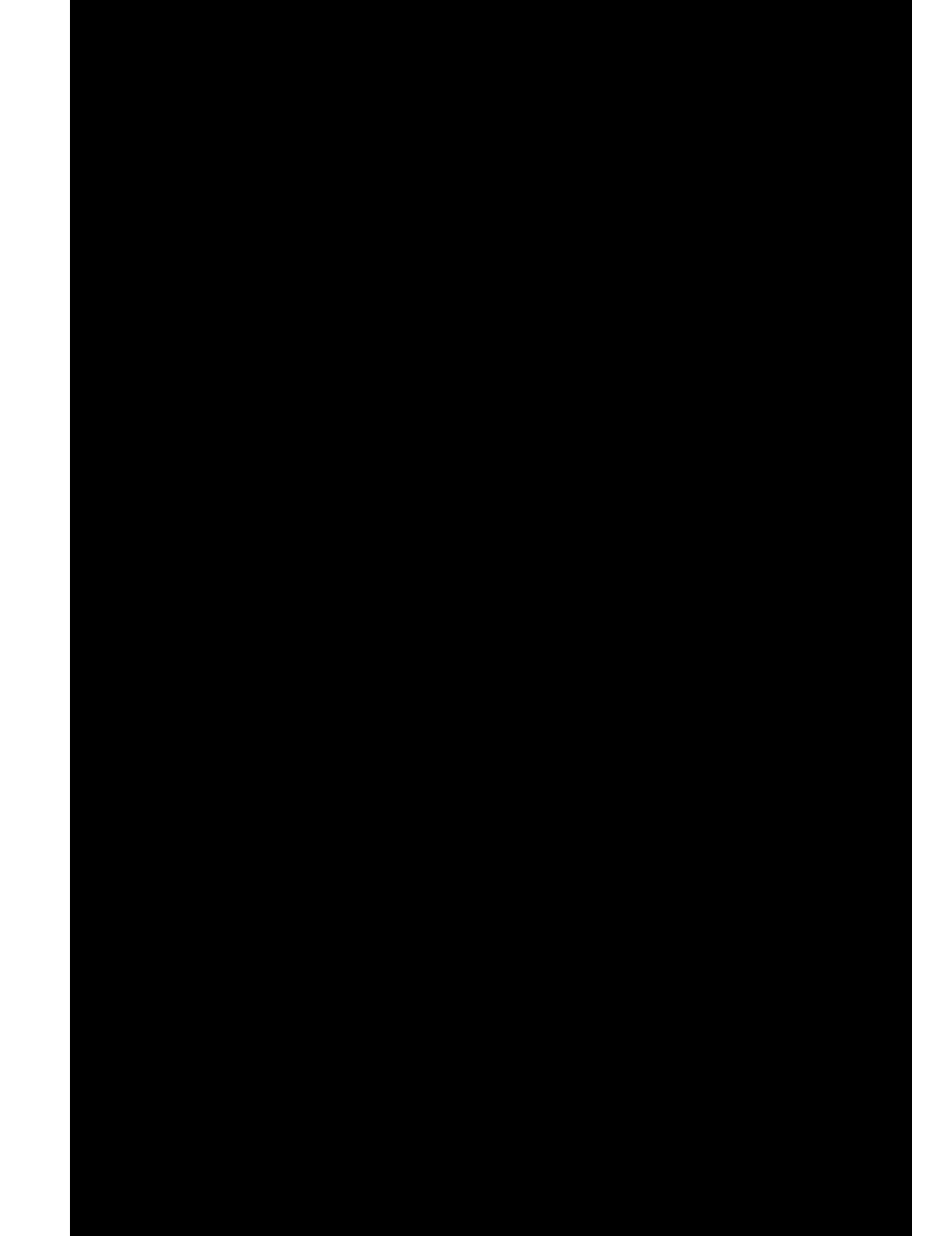

EXAMPLE 6

1-(3-ethylcarbamoyloxypropyl)-4-phenyl-1,2,3,6-tetrahydropyridine hydrochloride To a stirred solution of 4.3 g. (0.02 mole) of 1-(3-hydroxypropyl) - 4-phenyl-1,2,3,6-tetrahydropyridine in 50 ml. of dry benzene, there was added slowly a solution of 1.4 g. (0.02 mole) of ethyl isocyanate in 15 ml. of dry benzene. The resulting solution was stirred for 40 hours at room temperature and finally refluxed for one hour. After the solvent had been evaporated, the residue crystallized. It was recrystallized from an isooctane-benzene mixture. The product weighed 4.1 g. (72% yield) and melted at 80–81° C. A portion (1.0 g.) of the free base was dissolved in ether and treated with an ether-hydrogen chloride solution. The crystalline product which formed on standing was recrystallized from isopropanol-isopropyl ether. The white solid weighed 1.1 g. and melted at 157–158° C.

*Analysis.*—Calculated for $C_{17}H_{25}ClN_2O_2$ (percent): C, 62.85; H, 7.76; N, 8.63. Found (percent): C, 62.95; H, 7.93; N, 8.48.

EXAMPLE 7

1-(3-phenylcarbamoyloxypropyl)-4-phenyl-1,2,3,6-tetrahydropyridine

To a solution of 3.2 g. (0.015 mole) of 1-(3-hydroxypropyl)-4-phenyl-1,2,3,6-tetrahydropyridine in 50 ml. of dry benzene at 25° C., there was added slowly a solution of 1.8 g. (0.015 mole) of phenyl isocyanate in 10 ml. of dry benzene. The resulting solution was stirred for 16 hours under an atmosphere of nitrogen at ambient temperature and then treated with 50 ml. of isooctane. The white crystalline product which thereby formed was separated by filtration and recrystallized from a benzene-isooctane mixture. The product melted at 141–143° C. and weighed 4.0 g. (73% yield).

*Analysis.*—Calculated for $C_{21}H_{24}N_2O_2$ (percent): C, 74.97; H, 7.19; N, 8.33. Found (percent): C, 74.76; H, 7.26; N, 8.49.

EXAMPLE 8

1-(3-phenylcarbamoyloxypropyl)-4-(m-trifluoromethylphenyl)-1,2,3,6-tetrahydropyridine To a stirred solution of 5.7 g. (0.02 mole) of 1-(3-hydroxypropyl) - 4-(m-trifluoromethylphenyl)-1,2,3,6-tetrahydropyridine in 50 ml. of dry benzene at 25° C., there was slowly added a solution of 2.4 g. (0.02 mole) of phenyl isocyanate in 25 ml. of dry benzene. The resulting solution was stirred under an atmosphere of nitrogen at ambient temperature for 16 hours. After the solvent was evaporated at reduced pressure, the residual oil was treated with 50 ml. of isooctane. The crystalline product was separated by filtration and recrystallized from isooctane. The white compound weighed 7.0 g. (86% yield) and melted at 100–101° C.

*Analysis.*—Calculated for $C_{22}H_{23}N_2O_2F_3$ (percent): C, 65.35; H, 5.73; N, 6.93. Found (percent): C, 65.29; H, 5.51; N, 6.92.

EXAMPLE 9

1-[3-(3,4,5 - trimethoxyphenylcarbamoyloxy - propyl]-4-(m-trifluoromethylphenyl) - 1,2,3,6 - tetrahydropyridine hydrochloride To a stirred solution of 3.6 g. (0.012 mole) of 1-(3-hydroxypropyl) - 4 - (m-trifluoromethylphenyl)-1,2,3,6-tetrahydropyridine in 50 ml. of dry benzene at 25° C., there was added slowly a solution of 2.6 g. (0.012 mole) of 3,4,5-trimethoxyphenyl isocyanate in 20 ml. of dry benzene. The mixture was stirred for 16 hours at ambient temperature, filtered and the solvent evaporated at reduced pressure. The free base was dissolved in ether and treated with an ether hydrogen chloride solution. The crystalline compound which formed on standing was separated by filtration and recrystallized from an isopropanol-isopropyl ether mixture. The white salt which was obtained weighed 3.7 g. (59% yield) and melted at 164–165° C.

*Analysis.*—Calculated for $C_{25}H_{30}ClF_3N_2O_5$ (percent): C, 56.55; H, 5.69; N, 5.28. Found (percent): C, 56.30; H, 5.63; N, 5.32.

EXAMPLE 10

1-(3-methylcarbamoyloxypropyl) - 4 - (m-trifluoromethylphenyl)-1,2,3,6-tetrahydropyridine hydrochloride To a stirred solution of 5.7 g. (0.02 mole) of 1-(3-hydroxypropyl) - 4 - (m-trifluoromethylphenyl)-1,2,3,6-tetrahydropyridine in 50 ml. of dry benzene at 25° C., there was slowly added a solution of 1.7 g. (0.03 mole) of methyl isocyanate in 15 ml. of dry benzene. The resulting solution was stirred for 16 hours at ambient temperature and then the solvent was evaporated. The residue which crystallized on standing weighed 5.8 g. (88% yield) and melted at 60–64° C. The free base was dissolved in ether and treated with an ether-hydrogen chloride solution. The crystalline product which formed was recrystallized from an isopropanol-isopropyl ether mixture. The white salt thereby obtained melted at 159–161° C. and weighed 4.2 g.

*Analysis.*—Calculated for $C_{17}H_{22}ClF_3N_2O_2$ (percent): C, 53.90; H, 5.85; N, 7.40. Found (percent): C, 53.74; H, 5.73; N, 7.32.

Utilizing the method of Example 10, the following compounds are prepared from the stated ingredients:

1-(3-methylcarbamoyloxypropyl) - 4 - (4-ethylphenyl)-1,2,3,6-tetrahydropyridine from 4 - (4-ethylphenyl)-1-(3-hydroxypropyl) - 1,2,3,6 - tetrahydropyridine and methyl isocyanate;

1-(3-phenylcarbamoyloxypropyl) - 4 - (4-methoxyphenyl)-1,2,3,6-tetrahydropyridine from 1-(3-hydroxypropyl)-4-(4-methoxyphenyl) - 1,2,3,6 - tetrahydropyridine and phenyl isocyanate;

1-(2-phenylcarbamoyloxyethyl) - 4 - phenyl - 1,2,3,6-tetrahydropyridine from 1-(2-hydroxyethyl) - 4 - phenyl-1,2,3,6-tetrahydropyridine and phenyl isocyanate; and 1-(4-phenylcarbamoyloxybutyl) - 4 - phenyl - 1,2,3,6-tetrahydropyridine from 1-(4-hydroxybutyl) - 4 - phenyl-1,2,3,6-tetrahydropyridine and phenyl isocyanate.

The following procedure illustrates the process of administering an arylpyridinyl-alkyl alcohol derivative represented by Formula I to a mammalian host having symptomotology diagnosed as requiring tranquilizing or hypotensive treatment but not requiring restraint.

A capsule or tablet or other pharmaceutical form containing an effective dose of the medicament in the solid state, for example, from 5 to 50 mg., is administered via the oral route every four to six hours, or more often if need be. Initially, it is sometimes desirable to give a large dose, for example, one, two or three times the above dose, in order to obtain a pronounced initial effect. For example, for a host weighing 60–70 kg., a dose of from about .35 mg./kg./day to about 1.5 mg./kg./day is sufficient to give the required therapeutic effect.

The initial and subsequent doses of arylpyridinyl-alkyl alcohol derivative tranquilizer can also be administered parenterally by intramuscular or subcutaneous injection when desired. A water-soluble salt of an arylpyridinyl-alkyl alcohol derivative is particularly useful for purposes of injection. In general, the dose required for parenteral administration is somewhat less than that required to provide an equal effect by oral administration.

A further mode of evoking tranquilizing action by the administration of an arylpyridinyl-alkyl alcohol derivative is that of maintaining a small daily maintenance dose of about .35 mg./kg./day to about .70 mg./kg./day but increasing this dose in times of stress.

The various pharmaceutical forms referred to above are prepared by methods well known to the art. For example, a solid dosage form can comprise a gelatin capsule containing a dose amount of a compound of Formula I mixed

UNITED STATES PATENT OFFICE
CERTIFICATE OF CORRECTION

Patent No. 3,644,381      Dated  Feb. 22, 1972

Inventor(s)  Grover Cleveland Helsley

It is certified that error appears in the above-identified patent and that said Letters Patent are hereby corrected as shown below:

Column 8, line 14, change "methylcarbamolyloxpropyl" to read --methylcarbamoyloxypropyl--.

Signed and sealed this 11th day of July 1972.

(SEAL)
Attest:

EDWARD M. FLETCHER, JR.
Attesting Officer

ROBERT GOTTSCHALK
Commissioner of Patents